(12) United States Patent
Goto et al.

(10) Patent No.: US 9,356,371 B2
(45) Date of Patent: May 31, 2016

(54) CONNECTOR

(71) Applicant: Molex, LLC, Lisle, IL (US)

(72) Inventors: Satoshi Goto, Yamato (JP); Ryotaro Takeuchi, Yokohama (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/622,995

(22) Filed: Feb. 16, 2015

(65) Prior Publication Data
US 2015/0380845 A1    Dec. 31, 2015

(30) Foreign Application Priority Data

Jun. 30, 2014   (JP) ................................. 2014-133601

(51) Int. Cl.
| H01R 24/00 | (2011.01) |
| H01R 12/71 | (2011.01) |
| H01R 12/73 | (2011.01) |
| H01R 13/20 | (2006.01) |
| H01R 13/24 | (2006.01) |

(52) U.S. Cl.
CPC .............. *H01R 12/716* (2013.01); *H01R 12/73* (2013.01); *H01R 13/20* (2013.01); *H01R 13/2435* (2013.01)

(58) Field of Classification Search
CPC ........ H01R 24/76; H01R 12/57; H01R 12/52; H01R 13/629; H01R 13/20; H01R 13/41; H01R 12/716
USPC ........................................................ 439/660
See application file for complete search history.

(56) References Cited

U.S. PATENT DOCUMENTS

| 7,410,364 | B2 | 8/2008 | Kishi et al. | |
| 7,585,185 | B2 * | 9/2009 | Obikane | H01R 13/65802 439/108 |
| 7,901,218 | B2 | 3/2011 | Sato et al. | |
| 8,092,232 | B2 | 1/2012 | Takeuchi | |
| 8,485,832 | B2 * | 7/2013 | Mashiyama | H01R 12/716 439/74 |
| 8,845,339 | B2 * | 9/2014 | Ono | H01R 12/7052 439/74 |
| 8,961,215 | B2 | 2/2015 | Hasegawa | |

(Continued)

FOREIGN PATENT DOCUMENTS

| JP | 05-291769 A | 11/1993 |
| JP | 06-007258 U | 1/1994 |
| JP | 06-176807 A | 6/1994 |

*Primary Examiner* — Jean F Duverne
(74) *Attorney, Agent, or Firm* — James A. O'Malley (57) ABSTRACT

A connector comprises a first connector and a second connector. The first connector includes a first connector main body and a plurality of first terminals mounted side by side in the longitudinal direction of the first connector main body on both sides in the transverse direction of the first connector main body. The second connector includes a second connector main body for mating with the first connector main body and a plurality of second terminals mounted side by side in the longitudinal direction of the second connector main body on both sides in the transverse direction of the second connector main body. Each first terminal includes a first contact portion and a second contact portion facing each other. The first contact portion and the second contact portion overlap the corresponding second terminal. The amount of overlap is greater than the amount of clearance in the transverse direction of the first connector main body. Each second terminal is inserted between the first contact portion and the second contact portion of the corresponding first terminal and contacting the first terminal when the first connector main body is mated with the second connector main body.

15 Claims, 8 Drawing Sheets

(56) References Cited

U.S. PATENT DOCUMENTS

| | | | | |
|---|---|---|---|---|
| 9,039,428 B2* | 5/2015 | Sasaki | | H01R 13/631 439/74 |
| 9,153,892 B2* | 10/2015 | Tanaka | | H01R 13/04 |
| 2004/0014335 A1* | 1/2004 | Igarashi | | H01R 12/716 439/74 |
| 2005/0009383 A1 | 1/2005 | Okura et al. | | |
| 2006/0276061 A1* | 12/2006 | Koguchi | | H01R 12/725 439/74 |
| 2007/0010110 A1* | 1/2007 | Ono | | H01R 12/67 439/74 |
| 2009/0318029 A1* | 12/2009 | Takeuchi | | H01R 12/716 439/630 |
| 2009/0325396 A1* | 12/2009 | Takeuchi | | H01R 12/716 439/65 |
| 2011/0003513 A1* | 1/2011 | Matsumoto | | H01R 31/06 439/628 |
| 2012/0196486 A1* | 8/2012 | Midorikawa | | H01R 12/73 439/660 |
| 2012/0231637 A1 | 9/2012 | Takeuchi et al. | | |

* cited by examiner

CONNECTOR

REFERENCE TO RELATED APPLICATIONS

The Present Disclosure claims priority to prior-filed Japanese Patent Application No. 2014-133601, entitled "Connector," filed on 30 Jun. 2014 with the Japanese Patent Office. The content of the aforementioned Patent Application is incorporated in its entirety herein.

BACKGROUND OF THE PRESENT DISCLOSURE

The Present Disclosure relates, generally, to a connector, and, more particularly, to connectors able to reliably keep the first terminals of a first connector and the second terminals of a second connector engaged, to reliably maintain an electrical connection between the first terminals and the second terminals, and to reliably keep the first connector and the second connector mated.

Conventional board-to-board connectors are used to electrically connect a pair of parallel circuit boards. Such board-to-board connectors are mounted on the surfaces of the pair of circuit boards facing each other, and then mated to establish an electrical connection. The reinforcing metal fittings have been proposed which are mounted on both ends to function as locking members for keeping the two connectors mated. An example is disclosed in U.S. Pat. No. 7,901,218, the content of which is incorporated by reference in its entirety herein.

Figure 8A:
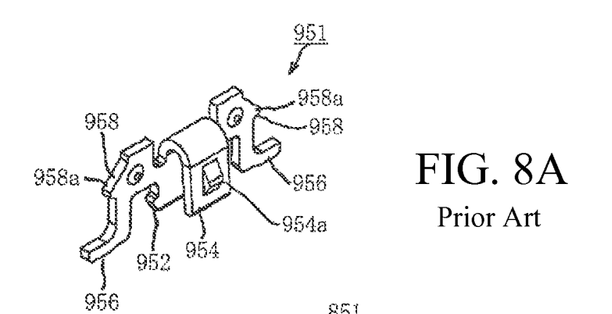
FIG. 8A is a perspective view of a second reinforcing metal fitting in a conventional connector.
Figure 8B:
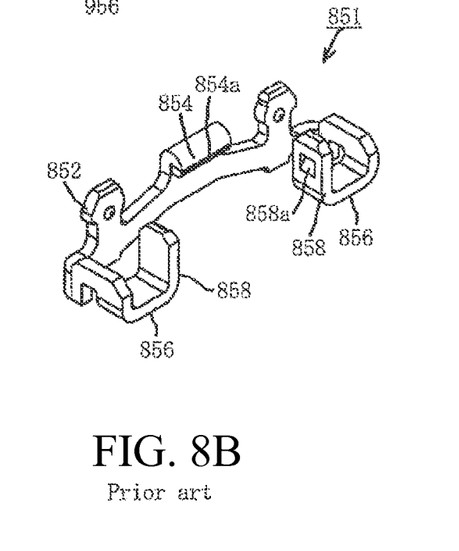
FIG. 8B is a perspective view of a first reinforcing metal fitting in a conventional connector.

FIGS. 8A and 8B illustrate perspective views of the reinforcing metal fittings in a conventional connector. In FIG. 8B, 851 is the first reinforcing metal fitting attached to both ends in the longitudinal direction of the housing of the first connector mounted on a first circuit board (not shown). In FIG. 8A, 951 is the second reinforcing metal fitting attached to both ends in the longitudinal direction of the housing of the second connector mounted on a second circuit board (not shown). The first reinforcing metal fitting 851 is a component integrally formed by stamping and bending a metal sheet, and includes a panel-shaped main body portion 852 extending in the transverse direction of the first connector, a board connecting portion 856 extending from both ends of the main body portion 852 in the longitudinal direction of the first connector and soldered to the first circuit board, a side engaging piece 858 extending upward from the end of each board connecting portion 856, a side engaging recessed portion 858a formed in the surface of each side engaging piece 858, a curved central engaging piece 854 connected to the center of the main body portion 852, and a central engaging edge portion 854a which is the leading edge of the central engaging piece 854. The second reinforcing metal fitting 951 is a component integrally formed by stamping and bending a metal sheet, and includes a panel-shaped main body portion 952 extending in the transverse direction of the second connector, a board connecting portion 956 extending from the lower edges at both ends of the main body portion 952 in the longitudinal direction of the second connector and soldered to the second circuit board, a side engaging piece 958 formed in the shoulder portion on both sides of the main body portion 952, a side engaging protruding portion 958a formed on the side edge of the side engaging piece 958, a curved central engaging piece 954 connected to the center of the main body portion 952, and a central engaging protruding portion 954a formed on the surface of the central engaging piece 954.

When the first connector and the second connector are mated, the side engaging pieces 858 and the central engaging piece 854 of the first reinforcing metal fitting 851 engage the side engaging pieces 958 and the central engaging piece 954 of the second reinforcing metal fitting 951. More specifically, the side engaging recessed portions 858a and the central engaging edge portion 854a of the first reinforcing metal fitting 851 engage the side engaging protruding portions 958a and the central engaging protruding portion 954a of the second reinforcing metal fitting 951. In this way, the first connector and the second connector are locked and remain mated. The first reinforcing metal fitting 851 or the second reinforcing metal fitting 951 can be on top and mated with the other reinforcing metal fitting. The orientation, in other words, can be the opposite of that shown in the Figures. Because an electrical connection is established when the first reinforcing metal fitting 851 and the second reinforcing metal fitting 951 come into contact with each other, the board connecting portion 856 of the first reinforcing metal fitting 851 is connected to the power line of the first circuit board, the board connecting portion 956 of the second reinforcing metal fitting 951 is connected to the power line of the second circuit board, and an electrical connection is established between the power line of the first circuit board and the power line of the second circuit board via the first reinforcing metal fitting 851 and the second reinforcing metal fitting 951.

However, in conventional connectors, the first reinforcing metal fitting 851 and the second reinforcing metal fitting 951 have to be rigid in order to provide reinforcement, and the side engaging pieces 858, the central engaging piece 854, the side engaging pieces 958, and the central engaging piece 954 are not flexible enough compared to the terminals. Therefore, when the electronic device in which the first circuit board and second circuit board are mounted is dropped or subjected to another external shock, and the resulting vibrations and impact are transmitted, the engaging pieces, which are not very flexible and elastically deformable, cannot maintain complete contact between the first reinforcing metal fitting 851 and the second reinforcing metal fitting 951, and sufficient electrical contact cannot be maintained between the power lines. Also, because the contact area between the side engaging recessed portion 858a and the central engaging edge portion 854a of the first reinforcing metal fitting 851 and the side engaging protruding portion 958a and the central engaging protruding portion 954a of the second reinforcing metal fitting 951 is very narrow, the contact resistance between the first reinforcing metal fitting 851 and the second reinforcing metal fitting 951 is greater. As a result, the size of the current flowing between the power lines of the first circuit board and the power lines of the second circuit board may be restricted.

SUMMARY OF THE PRESENT DISCLOSURE

It is an object of the Present Disclosure to solve the aforementioned problems by providing connectors able to reliably keep the first terminals of a first connector and the second terminals of a second connector engaged, to reliably maintain an electrical connection between the first terminals and the second terminals, and to reliably keep the first connector and the second connector mated.

The Present Disclosure is a connector comprising a first connector and a second connector. The first connector includes a first connector main body and a plurality of first terminals mounted side by side in the longitudinal direction of the first connector main body on both sides in the transverse direction of the first connector main body. The second connector includes a second connector main body for mating with the first connector main body and a plurality of second terminals mounted side by side in the longitudinal direction of the second connector main body on both sides in the transverse direction of the second connector main body. Each first terminal includes a first contact portion and a second contact portion facing each other. The first contact portion and the second contact portion overlap the corresponding second terminal. The amount of overlap is greater than the amount of clearance in the transverse direction of the first connector main body. Each second terminal is inserted between the first contact portion and the second contact portion of the corresponding first terminal and contacting the first terminal when the first connector main body is mated with the second connector main body.

In another connector of the Present Disclosure, among the plurality of first terminals, the first terminals positioned on both ends of the first connector main body in the longitudinal direction are wider than the other first terminals, and among the plurality of second terminals, the second terminals positioned on both ends of the second connector main body in the longitudinal direction are wider than the other second terminals. In another connector of the Present Disclosure, the longitudinal cross-sectional profile of all of the first terminals is the same, and the longitudinal cross-sectional profile of all of the second terminals is the same.

In another connector of the Present Disclosure, each of the first terminals has a held portion held by the first connector main body, a first contact portion, a second contact portion, and an elastically deformable contact arm portion connected to one end of the held portion, and the second contact portion is positioned closer to the held portion than the first contact portion. In another connector of the Present Disclosure, each of the first terminals includes a tail portion connected at one end to the held portion and connected electrically to a connecting pad on a board, the held portion being positioned farther to the outside in the transverse direction of the first connector main body than the contact arm portion.

The Present Disclosure is able to reliably keep the first terminals of a first connector and the second terminals of a second connector engaged, to reliably maintain an electrical connection between the first terminals and the second terminals, and to reliably keep the first connector and the second connector mated.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

FIGS. 1A-3 illustrate a first connector in an embodiment of the Present Disclosure. In the Figures, 1 is the first connector which is one of the pair of board-to-board connectors in the present embodiment. The first connector 1 is a surface mounted connector which is mounted on the surface of a first board (not shown), and mated with another connector or the second connector 101 described below. Also, the second connector 101 is the other one of the pair of board-to-board connectors in the present embodiment. This is also a surface mounted connector mounted on the surface of a second board (not shown). The first connector 1 and the second connector 101 in the present embodiment preferably establish an electrical connection between the first board and the second board. The first board and the second board can also be printed circuit boards used in electronic devices, flexible flat cables, flexible printed circuit boards, or any other type of board.

The first connector 1 has a first housing 11, which is an integrally molded connector main body made of an insulating material such as a synthetic resin. As shown, the first housing 11 has a rectangular thick panel-like shape, and has a rectangular recessed portion 12 with a surrounded perimeter formed on the side receiving the inserted second connector 101; that is, the mating surface 11*a* side (the upper side in FIG. 2). A first protruding portion 13 is integrally formed inside the recessed portion 12 of the first housing 11 as an island. Side wall portions 14 are integrally formed with the first housing 11 and extend parallel to the first protruding portion 13 on both sides of the first protruding portion 13.

Here, the first protruding portion 13 and the side wall portions 14 protrude upward from the bottom surface of the recessed portion 12, and extend in the longitudinal direction of the first housing 11. A slender recessed groove portion 12a extending in the longitudinal direction of the first housing 11 is formed as a section of the recessed portion 12 on both ends of the first protruding portion 13 between the first protruding portion 13 and the side wall portion 14.

Here, a groove-shaped first terminal accommodating inner cavity 15a is formed on both side surfaces of the first protruding portion 13. A groove-shaped first terminal accommodating outer cavity 15b is also formed on both inside surfaces of the side wall portions 14. The first terminal accommodating inner cavity 15a and first terminal accommodating outer cavity 15b are connected to and integrated with the bottom surface of the recessed groove portion 12a. When the first terminal accommodating inner cavity 15a and the first terminal accommodating outer cavity 15b are explained collectively, they will be referred to simply as the first terminal accommodating cavities 15.

In the present embodiment, first terminal accommodating cavities 15 are formed side by side in the longitudinal direction of the first housing 11 on both sides of the first housing 11 in the transverse direction. More specifically, a plurality are formed on both sides of the first protruding portion 13 at a predetermined pitch. The first terminals 61 accommodated inside each of these first terminal accommodating cavities 15 are also arranged on both sides of the first protruding portion 13 at the same pitch.

Because two types of first terminal 61 are accommodated inside first terminal accommodating cavities 15, a wide first terminal 61A and a narrow first terminal 61B, there are also two types of first terminal accommodating cavities 15, a wide first terminal accommodating cavity 15A for accommodating a wide first terminal 61A, and a narrow first terminal accommodating cavity 15B for accommodating a wide first terminal 61B. A wide first terminal accommodating cavity 15A is formed at both ends of the first housing 11 in the longitudinal direction in each row on both sides of the housing in the transverse direction, and the narrow first terminal accommodating cavities 15B are formed in each row between the wide first terminal accommodating cavities 15A at both ends. In the example shown, two narrow first terminal accommodating cavities 15B are formed on both sides of the first protruding portion 13. However, a single cavity can be formed on both sides or three or more cavities can be formed on both sides.

The wide first terminal accommodating cavities 15A and the narrow first terminal accommodating cavities 15B have the same configuration. Only the dimensions are different. Therefore, they can be referred to collectively as the first terminal accommodating cavities 15 in the following explanation. Similarly, the wide first terminals 61A and the narrow first terminals 61B have the same configuration. Only the dimensions are different. Therefore, they can be referred to collectively as the first terminals 61 in the following explanation.

Each first terminal 61 is an integrally formed component obtained by stamping and bending a conductive metal sheet, and includes a held portion 63, a tail portion 62 connected on one end to the bottom end of the held portion 63, and an elastically deformable contact arm portion 68 connected on one end to the upper end of the held portion 63. The contact arm portion 68 is a panel-shaped component bent into a U shape, and includes an upper connecting portion 67 connected to the upper end of the held portion 63, a second contact portion 66 formed near the inside end of the upper connecting portion 67, a lower connecting portion 64 connected to the second contact portion 66, and a first contact portion 65 formed near the free end of the lower connecting portion 64.

The held portion 63 extends vertically, that is, in the thickness direction of the first housing 11, and is inserted into and held by a first terminal accommodating outer cavity 15b. The tail portion 62 is curved and connected to the held portion 63, extends to the outside in the transverse direction, that is, in the width direction of the first housing 11, and is connected using, for example, solder to a connecting pad linked to a conductive trace in the first board.

The contact arm portion 68 extends from the held portion 63 inward in the transverse direction of the first housing 11. More specifically, the upper connecting portion 67 is bent and connected to the held portion 63, and extends inward in the transverse direction of the first housing 11. A second contact portion 66 is formed on the inner end of the upper connecting portion 67 so as to bend downward and protrude inward in the transverse direction of the housing 11. The lower connecting portion 64 has a U-shaped lateral profile and is connected to the second contact portion 66. A first contact portion 65 is formed near the free end of the lower connecting portion 64, that is, near the upper end to the inside, is bent into a U-shape, and protrudes outward in the transverse direction of the first housing 11.

The first contact portion 65 of each wide first terminal 61A is wider in the longitudinal direction of the first housing 11, and the contacting portion is tube-shaped and centered on the longitudinal axis. Each first terminal 61 is fitted into a first terminal accommodating cavity 15 from the mounting surface 11b (the lower end in FIG. 3), and the held portion 63 is clamped on both sides by the side wall of the first terminal accommodating outer cavity 15b formed in the inside surfaces of the side wall portion 14 to secure the first housing 11. When the first terminal 61 is mounted in the first housing 11, the first contact portion 65 and the second contact portion 66 are positioned to the left and right of the recessed groove portion 12a and face each other. The gap between the first contact portion 65 and the second contact portion 66 facing each other is narrower than the gap between the first contact portion 165 and the second contact portion 166 of the corresponding second terminal 161 in the second connector 101 described below. The first contact portion 65 and the second contact portion 66 both overlap the second terminal 161.

Because each first terminal 61 is an integrally formed component obtained by machining a metal strip, it has elasticity. Therefore, the first contact portion 65 and the second contact portion 66 are each elastically displaceable in the transverse direction of the first housing 11. The gap between a first contact portion 65 and a second contact portion 66 facing each other is also elastically displaceable. In other words, when a second terminal 161 is inserted between the first contact portion 65 and the second contact portion 66, the first contact portion 65 and the second contact portion 66 are elastically displaced in the transverse direction of the first housing 11, and the gap between the first contact portion 65 and the second contact portion 66 is extended elastically.

All of the first terminals 61, that is, all of the wide first terminals 61A and narrow first terminals 61B, have the same vertical cross-sectional profile along a line passing from the free end of the tail portion 62 through the held portion 63 and towards the free end of the contact arm portion 68. As a result, the electrified length of all first terminals 61 from the tail portion 62 to contact with the second terminal 161 is equal.

First protruding end portions 21 serving as mating guide portions are arranged at both ends of the first housing 11 in the longitudinal direction. A protruding end recessed portion 22 is formed in a section of the recessed portion 12 of each first protruding end portion 21. Each protruding end recessed portion 22 is a recessed portion with a rectangular profile, and is connected to both ends of each recessed groove portion 12*a* in the longitudinal direction. When the first connector 1 and the second connector 101 have been mated, the protruding end recessed portions 22 function as insertion recessed portions into which the second protruding end portions 122 in the second housing 111 of the second connector 101 described below have been inserted.

A pair of inner wall surfaces 22*a* positioned inside the protruding end recessed portions 22 on both sides of the first housing 11 in the transverse direction have a flat surface extending in the longitudinal direction of the first housing 11 and in the mating direction of the first connector 1 and the second connector 101, oppose a pair of outer wall surfaces 122*a* of the second protruding end portions 122 inserted into the protruding end recessed portions 22, and function as reference surfaces for positioning the second housing 111 relative to the width direction of the first housing 11. The space between the opposing inner wall surfaces 22*a* is wider than the space between the outer wall surfaces 122*a*. In other words, clearance is created in the transverse direction of the housing 11 between the opposing inner wall surfaces 22*a* and outer wall surfaces 122*a*.

The first protruding end portion 21 includes a side wall extending portion 21*b* extending from both longitudinal ends of the side wall portions 14 in the longitudinal direction of the first housing 11, and end wall portions 21*c* extending in the short-axis direction of the first housing 11 with both ends connected to the side wall extending portion 21*b*. A first reinforcing metal fitting 51 is attached to the first protruding end portion 21. The first reinforcing metal fitting 51 is accommodated inside and held by the first metal fitting holding recessed portion 26 formed on the outer periphery of the first protruding end portion 21. The first metal fitting holding recessed portion 26 includes an outer end portion accommodating portion 26*a* extending continuously in the thickness direction of the first housing 11 and along the center line of a dog leg-shaped side wall formed by the end wall portion 21*c* and the side wall extending portion 21*b* connected to both ends; a side panel portion accommodating cavity 26*d* connected to the outer end portion accommodating portion 26*a*, formed between the side wall portion 14 and the side wall extending portion 21*b*, and opening outward in the transverse direction of the first housing 11; and a central leg portion accommodating cavity 26*c* connected to the outer end portion accommodating portion 26*a* and opening into the outer surface of the end wall portion 21*c*.

The first reinforcing metal fitting 51 is an integrally formed component obtained by stamping and bending a metal sheet, and includes a slender, band-like first main body portion 52 extending in the transverse direction of the first housing 11, and a curved first side panel portion 57 connected to the outer end of the first main body portion 52 in the transverse direction of the first housing 11. The first reinforcing metal fitting 51 is C-shaped when viewed from the mating surface 11*a* side, and is accommodated inside each first metal fitting holding recessed portion 26.

The first reinforcing metal fitting 51 includes a first side leg portion 56 serving as a board connecting portion connected to the lower end of the first side panel portion 57, and the first central leg portion 55 serving as another board connecting portion connected to the lower end of the first main body portion 52 to the inside in the transverse direction of the first housing 11. The first side leg portion 56 is a panel-shaped component extending so as to be flush with the first side panel portion 57, and the first central leg portion 55 is a panel-shaped component extending so as to be flush with the first main body portion 52. The first side leg portion 56 can be connected on the lower end using, for example, solder to a connecting pad formed on the surface of the first board. By connecting the lower end of the first side leg portion 56 to a reinforcing connecting pad on the first board using, for example, solder, the first reinforcing metal fitting 51 is less susceptible to deformation, and the strength of the first housing 11 is effectively reinforced. The first reinforcing metal fitting 51 is inserted into the first metal fitting holding recessed portion 26 from the mating surface 11*a* side, the first side leg portion 56 is accommodated inside the side panel portion accommodating cavity 26*d*, and the first central leg portion 55 is accommodated inside the central leg portion accommodating cavity 26*c* to secure the metal fitting to the first housing 11.

Figure 1A:
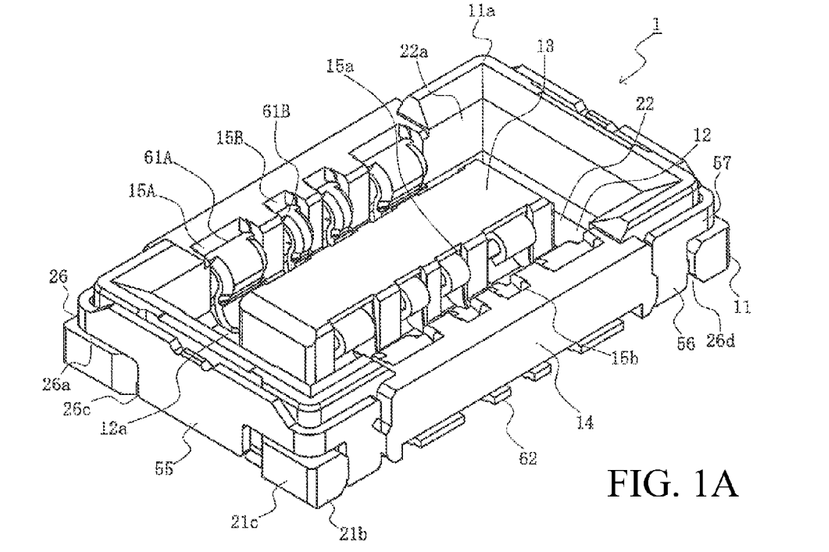
FIG. 1A is a perspective view a first connector of the Present Disclosure taken from above.
Figure 1B:
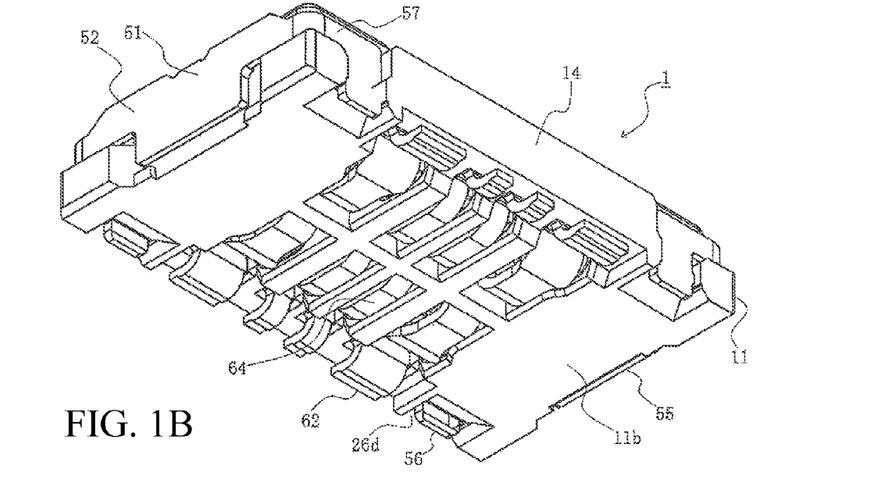
FIG. 1B is another perspective view of the embodiment depicted in FIG. 1A taken from below.
Figure 2:
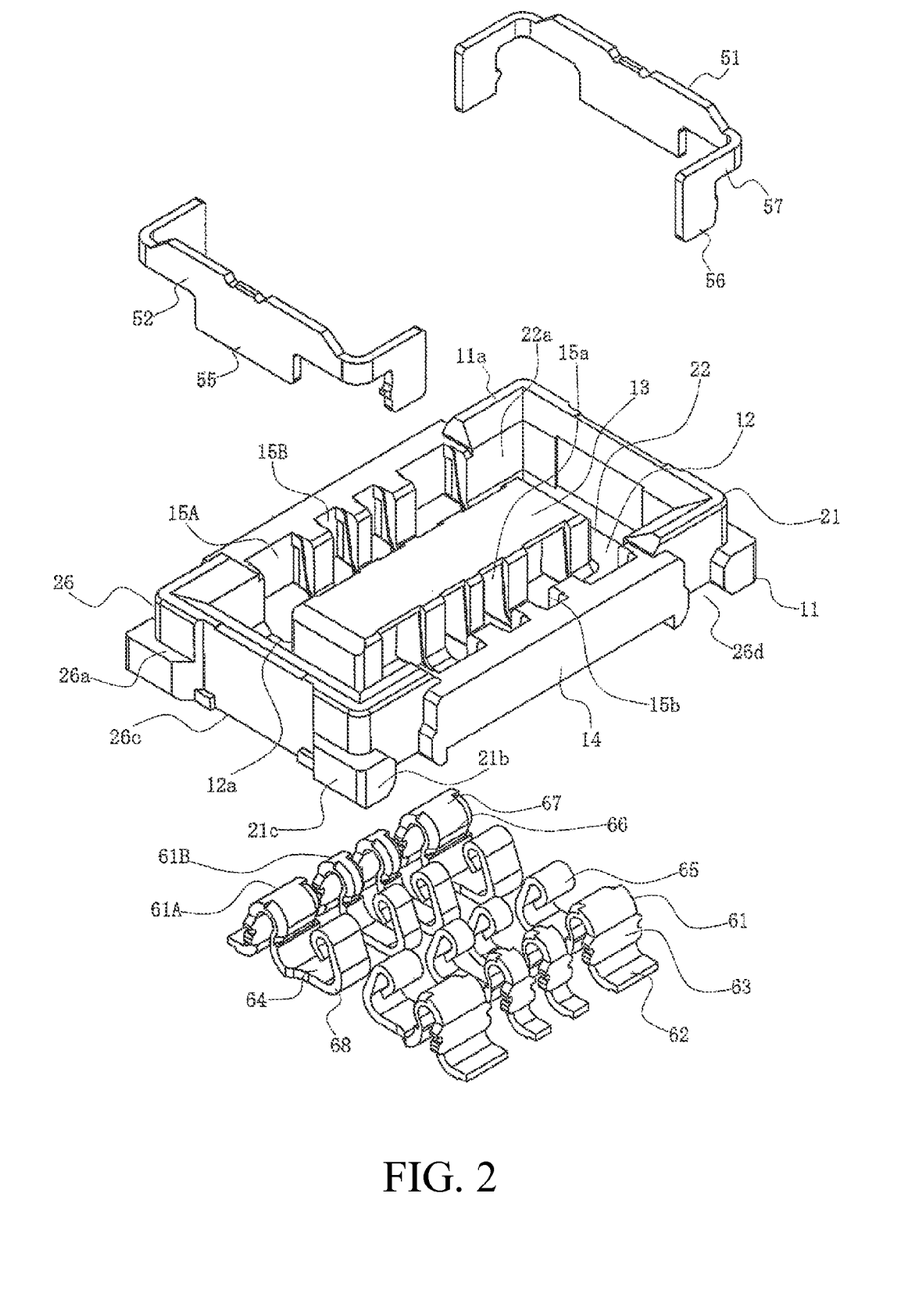
FIG. 2 is an exploded perspective view from above of the first connector of FIG. 1.
Figure 3:
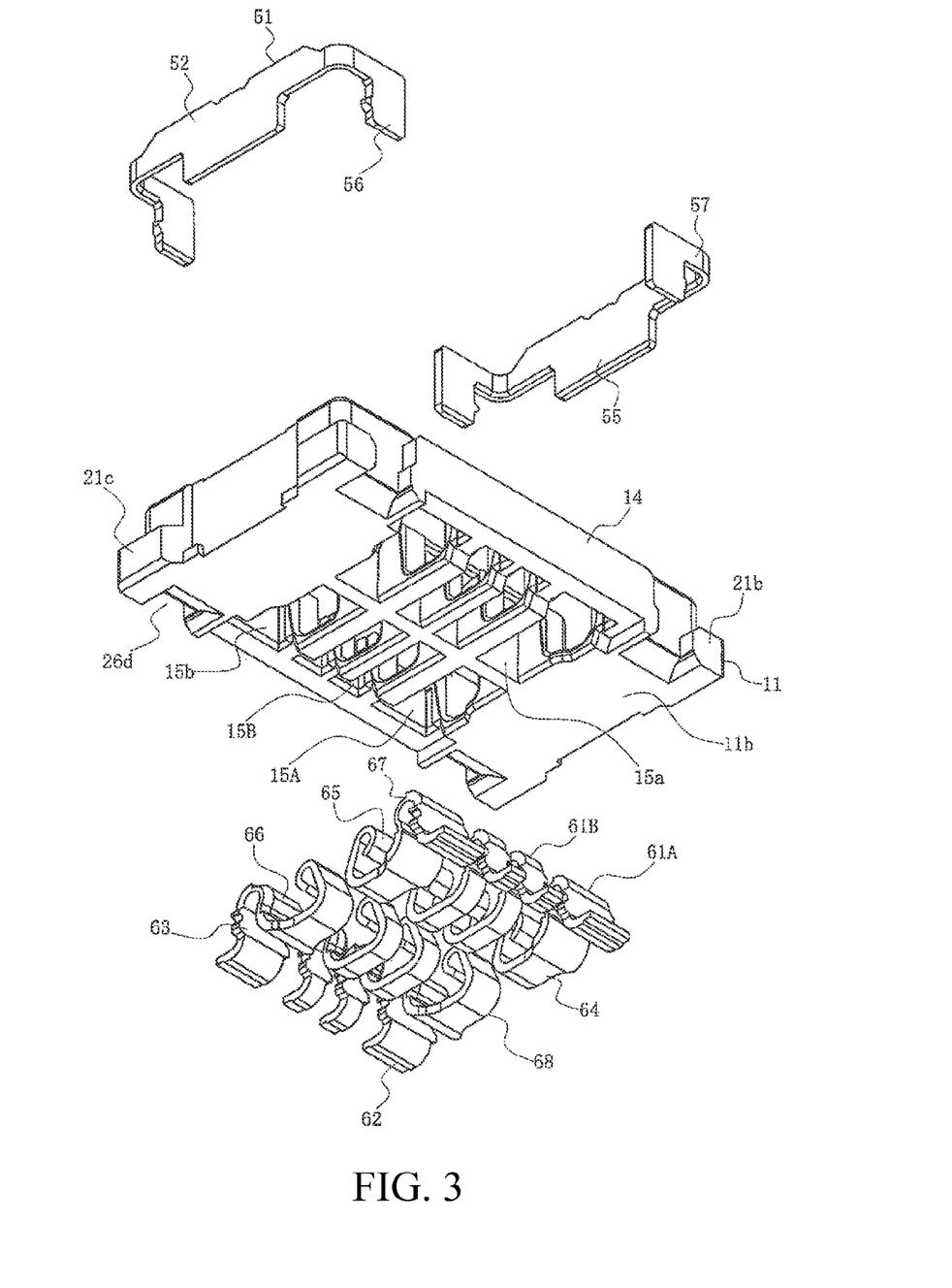
FIG. 3 is an exploded perspective view from below of the first connector of FIG. 1.
Figure 4A:
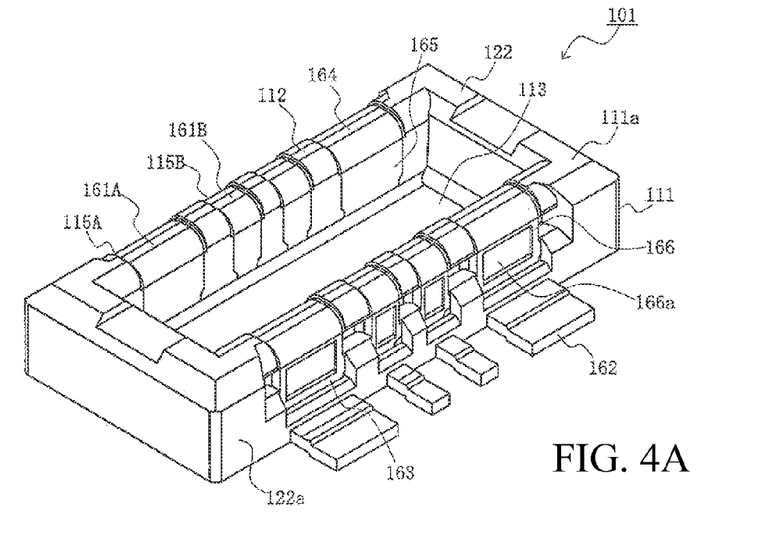
FIG. 4A is a perspective view of a second connector of the Present Disclosure taken from above
Figure 4B:
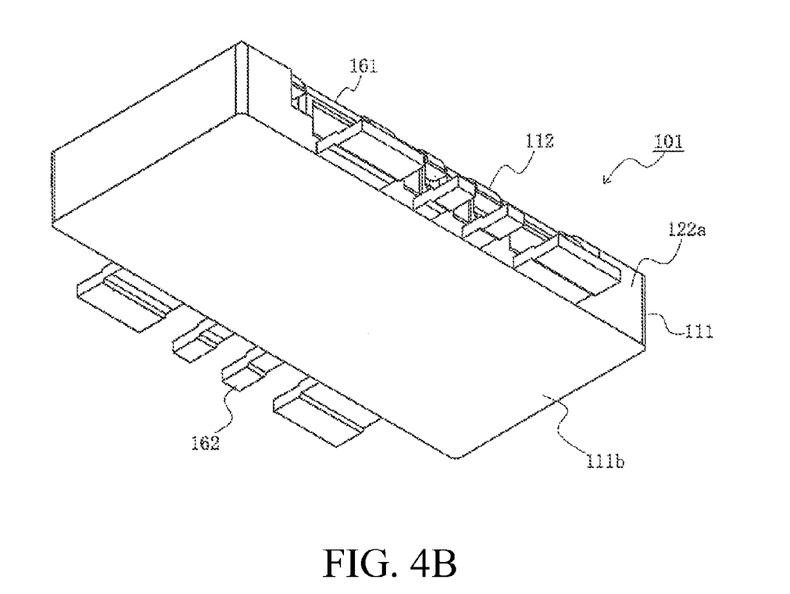
FIG. 4B is another perspective view of the embodiment depicted in FIG. 4A, taken from below.
Figure 5:
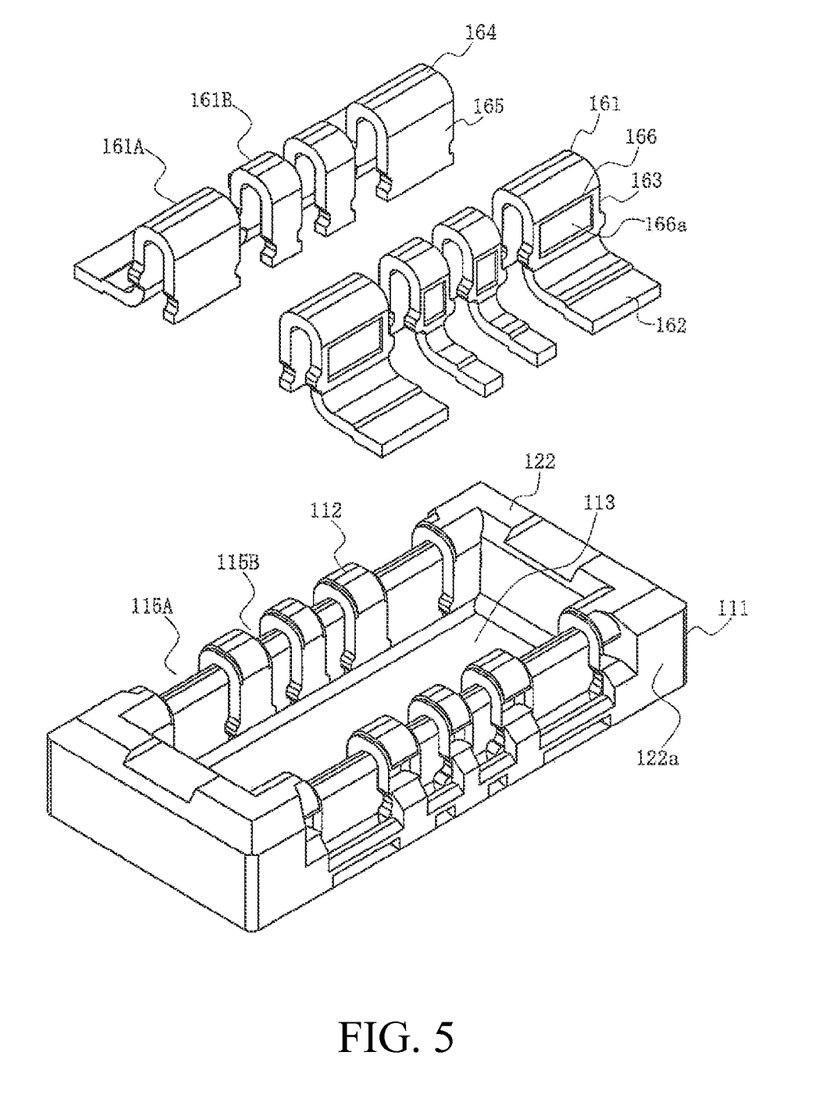
FIG. 5 is an exploded perspective view from above of the second connector of FIG. 4.

FIGS. 4-5 illustrate a first connector in an embodiment of the Present Disclosure. In the Figures, the second connector 101 has a second housing 111, which is the integrally molded second connector main body made of an insulating material such as a synthetic resin. As shown, the second housing 111 has a rectangular thick panel-like shape. The second housing 111 includes an integrally formed slender recessed groove portion 113 extending in the longitudinal direction of the second housing 111 on the side mated with the first connector 1, that is, in the mating surface 111*a* side (the upper side in FIG. 4A), and second protruding portions 112 serving as slender protruding portions, which define the outside of the recessed groove portion 113 and extend in the longitudinal direction of the second housing 111. The second protruding portions 112 extend along both sides of the recessed groove portion 113 and along both sides of the second housing 111.

Each second protruding portion 112 includes a recessed groove-like second terminal accommodating cavity 115 spanning the inner surface of the second protruding portion 112, the upper surface of the second protruding portion 112, and the outer surface of the second protruding portion 112. The opposing second terminal 161 is accommodated and mounted inside the second terminal accommodating cavity 115. As shown, the bottom of the recessed groove portion 113 is closed on the side mounted on the second board, that is, on the mounting surface 111*b* (the lower surface in FIG. 4B).

In the present embodiment, the second terminal accommodating cavities 115 are formed side by side in the longitudinal direction of the second housing 111, and are formed on both sides in the transverse direction of the second housing 111. More specifically, a plurality are formed in the second protruding portion 112 at a predetermined pitch. A second terminal 161 for accommodation inside each second terminal accommodating cavity 115 is also arranged on the second protruding portion 112 at the same pitch.

Because there are two types of second terminal 161 accommodated inside the second terminal accommodating cavities 115, wide second terminals 161A and narrow second terminals 161B, there are two types of second terminal accommodating cavities 115, wide second terminal accommodating cavities 115A for accommodating wide second terminals 161A and narrow second terminal accommodating cavities 115B for accommodating narrow second terminals 161B. Wide second terminal accommodating cavities 115A are formed at the ends of each row in the transverse direction of the second housing 111 at both ends of the housing in the longitudinal direction. Narrow second terminal accommodating cavities 115B are formed in each row between the wide second terminal accommodating cavities 115A at both ends. In the example shown, there are two wide second terminal accommodating cavities 115B on the second protruding portion 112 at both ends. However, one or even three or more can be used.

The wide second terminal accommodating cavities 115A and narrow second terminal accommodating cavities 115B have the same configuration except for the width dimensions. Therefore, they may be referred to collectively as the second terminal accommodating cavities 115 in the following explanation. The wide second terminals 161A and narrow second terminals 161B have the same configuration except for the width dimensions. Therefore, they may be referred to collectively as the second terminals 161 in the following explanation.

Each second terminal 161 is an integrally formed conductive metal panel which has been stamped and bent, and has a held portion 163, a tail portion 162 connected to the bottom end of the held portion 163, a first contact portion 165 connected to the inside end of the connecting portion 164, and a second contact portion 166 formed on the outer surface of the held portion 163. Each second terminal 161 has a U-shaped profile excluding the tail portion 162. A second contact recessed portion 166a is formed in the surface of the second contact portion 166.

In the present embodiment, the first contact portion 165 is flat. Because, as mentioned above, the first contact portion 65 of the wide first terminals 61A is tube-shaped with the axis in the longitudinal direction of the first housing 11, the first contact portion 65 can come into complete contact with the flat first contact portion 165 of the second terminal 161 in the longitudinal direction, that is, in the transverse direction of the terminal. Because the first contact portion 65 is formed on the leading end of the first terminal 61, it is relatively flexible and can make full contact with the flat first contact portion 165 in the transverse direction, on somewhat of an incline relative to the longitudinal direction.

Each second terminal 161 is inserted into a second terminal accommodating cavity 115 from the mating surface 111a side, the held portion 163 is accommodated in a section of the inside surface of the second terminal accommodating cavity 115 to the outside of the second protruding portion 112, and both sides are clamped by the side walls to secure the terminal inside the second housing 111. Preferably, each second terminal 161 is integrally formed and secured in the second housing 111 using a molding method such as insert molding or overmolding.

When the second terminal 161 has been mounted in the second housing 111, the surfaces of the first contact portion 165, connecting portion 164 and second contact portion 166 are exposed in the side surfaces and mating surface of the second protruding portion 112. The tail portion 162 extends outward from the second housing 111, and is connected using, for example solder to a connecting pad linked to a conductive trace on the second board.

Because first contact portion 165 and the second contact portion 166 are secured in the second housing 111 so that the second protruding portion 112 is clamped from both sides, they cannot be substantially displaced in the transverse direction of the second housing 111 and the gap does not change. In other words, even when a second terminal 161 has been inserted between the first contact portion 65 and the second contact portion 66 of a first terminal 61, the first contact portion 65 and the second contact portion 66 are elastically deformable, but the first contact portion 165 and the second contact portion 166 are not displaced in the transverse direction of the second housing 111.

All of the second terminals 161, that is, all of the wide second terminals 161A and narrow second terminals 161B have the same vertical cross-section shape, that is, the cross-sectional shape extending along an axis from the free end of the tail portion 162, through the held portion 163 to the leading end of the first contact portion 165. As a result, the electrified length of all second terminals 161 is the same from the tail portion 162 to the section making contact with the first terminal 61.

A second protruding end portion 122 serving as a mating guide portion is provided on both ends of the second housing 111 in the longitudinal direction. The second protruding end portions 122 are thick components extending in the transverse direction of the second housing 111, and both ends are connected to each second protruding portion 112 in the longitudinal direction. When the first connector 1 and the second connector 101 are mated, the second protruding end portions 122 function as insertion protruding portions for insertion into the protruding end recessed portions 22 of the first protruding end portions 21 in the first connector 1.

A pair of outer wall surfaces 122a positioned on both sides of the second protruding end portion 122 in the transverse direction of the second housing 111 are flat surfaces extending in the longitudinal direction of the second housing 111 and in the mating direction of the first connector 1 and the second connector 101. These face the pair of inner wall surfaces 22a of the protruding end recessed portion 22 of the first protruding end portion 21 receiving the inserted second protruding end portion 122, and serve as reference surfaces for positioning the first housing 11 with respect to the transverse direction of the second housing 111. The space between the outer wall surfaces 122a is narrower than the space between the inner wall portions 22a. In other words, clearance is created between the opposing inner wall surfaces 22a and outer wall surfaces 122a in the transverse direction of the second housing 111.

FIGS. 6-7 illustrate the operations performed to mate a first connector 1 and a second connector 101 with the aforementioned configurations. In the present embodiment, the first terminals 61 and the second terminals 161 may be connected to signal lines or power lines. For example, all of the first terminals 61 and second terminals 161 can form parallel circuits connected to power lines. In this example, the wide first terminals 61A and the narrow first terminals 61B have the same vertical cross-sectional profile and electrified length, differing only in the width direction. Similarly, the wide second terminals 161A and the narrow second terminals 161B have the same vertical cross-sectional profile and electrified length, differing only in the width direction. The resistance value depends only on the width direction, and the shunt calculation is easy to perform. Because the wide first terminals 61A and second terminals 161A, which have a higher current level and amount of generated heat, are present on both sides of the first housing 11 and the second housing 111 in the longitudinal direction, the heat is readily dissipated and does not build up inside the first connector 1 and the second connector 101.

Also, the wide first terminals 61A and second terminals 161A can be connected to power lines, and the narrow first terminals 61B and second terminals 161B can be connected to signal lines. Here, the power lines from the battery in the electronic device can be connected to the wide first terminals 61A and second terminals 161A, and the signal lines used to transmit signals indicating the ID number, remaining power level, and temperature of the battery can be connected to the narrow first terminals 61B and second terminals 161B. Because the wide first terminals 61A and second terminals 161A are present on both sides of the first housing 11 and the second housing 111 in the longitudinal direction, the heat is readily dissipated and does not build up inside the first connector 1 and the second connector 101.

Here, the first connector 1 is surface mounted on the first board (not shown) by connecting the tail portions 62 of the first terminals 61 using, for example, solder to the connecting pads linked to the conductive traces of the first board, and by connecting the bottom ends of the first side leg portions 56 of the first reinforcing metal fitting 51 using, for example, solder to anchoring pads on the first board. The conductive traces linked to the connecting pads that are connected to the tail portions 62 of the narrow first terminals 61B are signal lines, and the conductive traces linked to the connecting pads that are connected to the tail portions 62 of the wide first terminals 61A are power lines. The connecting pads connected to each tail portion 62 are separate from each other. Therefore, four power lines are connected to the four wide first terminals 61A of the first connector 1.

Similarly, the second connector 101 is surface mounted on the second board (not shown) by connecting the tail portions 162 of the second terminals 161 using, for example, solder to the connecting pads linked to the conductive traces of the second board. The conductive traces linked to the connecting pads that are connected to the tail portions 162 of the narrow second terminals 161B are signal lines, and the conductive traces linked to the connecting pads that are connected to the tail portions 162 of the wide second terminals 161A are power lines. The connecting pads connected to each tail portion 162 are separate from each other. Therefore, four power lines are connected to the four wide second terminals 161A of the second connector 101.

Figure 6A:
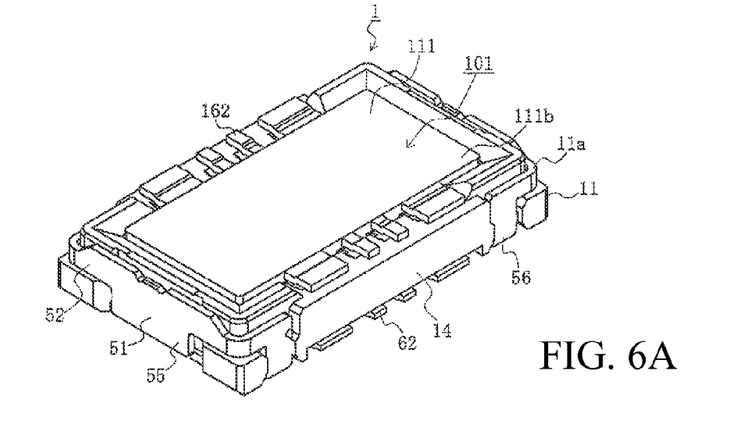
FIG. 6A is a perspective view from above of the first connector and the second connector of FIGS. 1A and 4A, mated with each other.
Figure 6B:
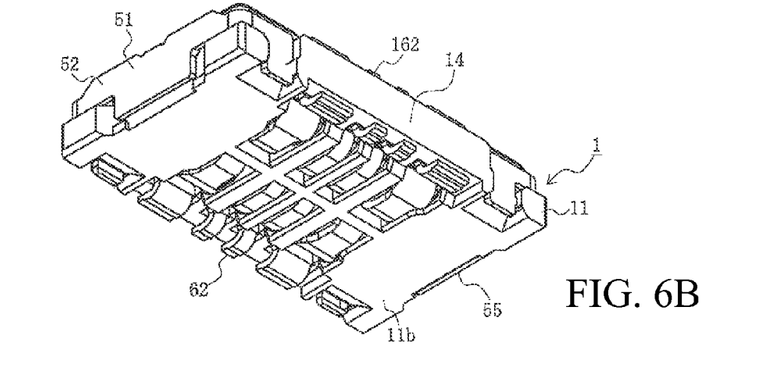
FIG. 6B is a perspective view from below of the embodiment depicted in FIG. 6A.
Figure 6C:
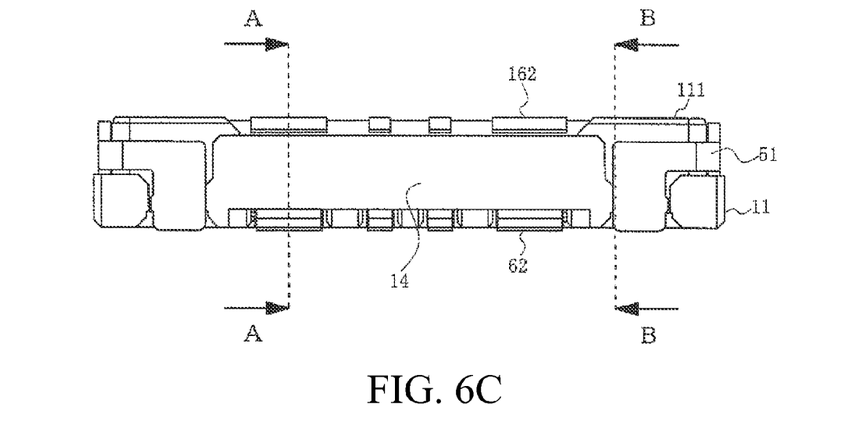
FIG. 6C is an elevated side view of the embodiment depicted in FIG. 6A.

First, the operator brings the mating surface 11a of the first housing 11 of the first connector 1 opposite the mating surface 111a of the second housing 111 of the second connector 101, aligns the positions of the second protruding portions 112 of the second connector 101 with the positions of the corresponding recessed groove portions 12a in the first connector 1, and aligns the positions of the second protruding portions 122 of the second connector 101 with the positions of the corresponding protruding end recessed portions 22 of the first connector 1 to complete the positioning of the first connector 1 and the second connector 101. The first connector 1 and/or second connector 101 is moved closer to the other connector, that is, in the mating direction, and the second protruding portions 112 and the second protruding end portions 122 of the second connector 101 are inserted into the recessed groove portions 12a and protruding end recessed portions 22 of the first connector 1. When the first housing 11 and the second housing 111 have been mated and the first connector 1 and the second connector 101 have been mated as shown in FIGS. 6A-6C, an electrical connection is established between the first terminals 61 and the second terminals 161.

More specifically, each second terminal 161 on the second connector 101 is inserted between the first contact portion 65 and second contact portion 66 of a first terminal 61, the first contact portion 65 of the first terminal 61 and the first contact portion 165 of the second terminal 161 come into contact, and the second contact portion 66 of the first terminal 61 and the second contact portion 166 of the second terminal 161 come into contact. As a result, the conductive traces linked to the connecting pads of the first board connected to the tail portions 62 of the first terminals 61 and the conductive traces linked to the connecting pads of the second board connected to the tail portions 162 of the second terminals 161 establish an electrical connection. Because contact is made between the first terminals 61 and the second terminals 161 at multiple points, a reliable electrical connection is maintained.

The spring action of the contact arm portion 68 causes the first contact portion 65 and the second contact portion 66 to clamp the second terminal 161 on both sides. In addition, the second contact portion 66 of the first terminal 61 engages the second contact recessed portion 166a formed in the surface of the second contact portion 166 of the second terminal 161. Because each second terminal 161 is securely held by a first terminal 61, the second terminals 161 do not become detached from the first terminals 61, and the first connector 1 and the second connector 101 remain mated.

The spring action of the contact arm portion 68 also keeps the first contact portions 65 and the first contact portions 66 of the first terminals 61 in contact with the second contact portions 165 and the second contact portions 166 of the second terminals 161 even when the second terminals 161 are displaced in the transverse direction of the first housing 11 relative to the first terminals 61. Therefore, even when vibrations and impacts generated when the electronic device containing the mounted first board and second board is dropped or struck are transmitted, and the second terminals 161 are displaced relative to the first terminals 61 in the transverse direction of the first housing 11, a reliable electrical connection is maintained between the first terminals 61 and the second terminals 161, and a temporary power disruption or power flicker does not occur. In addition, because the spring action of the contact arm portion 68 acts more strongly on the wide first terminals 61A at both ends of the first housing 11 in the longitudinal direction than on the narrow first terminals 61B, displacement is suppressed and power flickers do not occur even when the second housing 111 is rotated (twisted) relative to the first housing 11 and the rotational moment is increased by the spring action of the contact arm portions 68 of the wide first terminals 61A farther from the center of rotation.

Figure 7A:
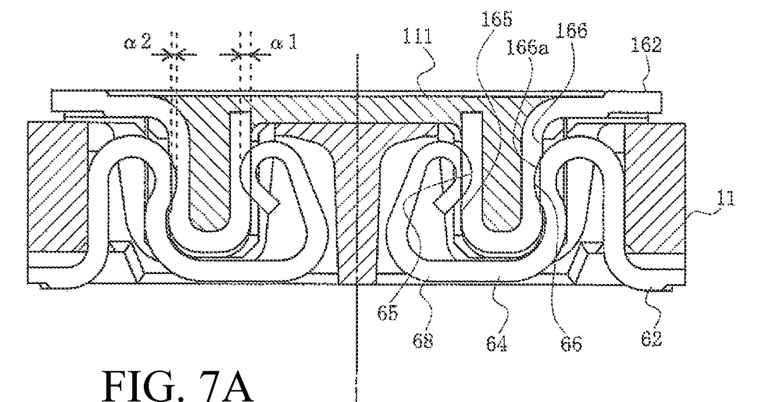
FIG. 7A is a cross-section view illustrating the relationship between the overlap of first terminals and second terminals taken along Lines A-A in FIG. 6C.

As mentioned above, the first contact portion 65 and second contact portion 66 of each first terminal 61 overlap with a second terminal 161. This means that, when the contact arm portion 68 is not elastically deformed, that is, the first contact portion 65 and the second contact portion 66 are not elastically deformed, as shown in FIG. 7A, the central axis in the transverse direction of the first housing 11 and the central axis in the transverse direction of the second housing 111 are aligned as indicated by axial line C and, when the first connector 1 and the second connector 101 are mated, the first contact portion 65 and the second contact portion 66 overlap with the second terminal 161. The amount is referred to as the amount of overlap. In other words, the overlap is the overlap of the first contact portion 65 and the second contact portion 66 with the second terminal 161 when the initial horizontal cross-sectional profile of the first connector 1 prior to elastic deformation of the contact arm portion 68 overlaps the horizontal cross-sectional profile of the second connector 101 so that the central axis in the transverse direction of the first housing 11 is aligned with the central axis in the transverse direction of the second housing 111, and the amount is referred to as the amount of overlap.

In the Present Disclosure, one of the two contact portions of the first terminal 61 or both of the two contact portions, that is, one or both of the first contact portion 65 and the second contact portion 66, can overlap with the second terminal 161. More specifically, the amount of overlap by the first contact portion 65 is the amount of overlap relative to the first contact portion 165 of the second terminal 161, denoted by a1 in FIG.

7A, and the amount of overlap by the second contact portion 66 is the amount of overlap relative to the second contact portion 166 of the second terminal 161, denoted by α2 in FIG. 7A.

Here, the relationship α1>α2 is established. In other words, the second contact portion 66 relatively close to the held portion 63 held and secured in the first housing 11 is relatively inelastic, rigid, and less elastically deformable. In contrast, the first contact portion 65 relatively far from the held portion 63 is relatively elastic, flexible, and more elastically deformable.

Because the first contact portion 65 and the second contact portion 66 on both sides of the second terminal 161 overlap with the second terminal 161, the first contact portion 65 and the second contact portion 66 can be displaced when there is relative displacement of the second terminal 161 to the left or right in the transverse direction of the first housing 11, and the second terminal 161 remains clamped on both sides. Therefore, even when the second terminal 161 is displayed relative to the first terminal 61 in the transverse direction of the housing 11, the second terminal 161 does not become detached from the first terminal 61, the first connector 1 and the second connector 101 remain mated, displacement is suppressed, and a power flicker does not occur. Also, the electrified length from the tail portion 62 to the section making contact with the second terminal 161 does not change.

If the first contact portion 65 overlaps with the second terminal 161, but the second contact portion 66 does not overlap with the second terminal 161, and the second terminal 161 is displaced away from the held portion 63 relative to the first terminal 61, the second contact portion 66 cannot be displaced, and separates from the second terminal 161. The second terminal 161 does not remain clamped on both sides by the first terminal 61, the first connector 1 and the second connector 101 do not remain reliably mated, and the larger amount of displacement may cause a power flicker. Contact with the second terminal 161 is reduced closer to the tail portion 62 but the second terminal 161 remains in contact farther from the tail portion 62, thereby increasing the electrified length.

Figure 7B:
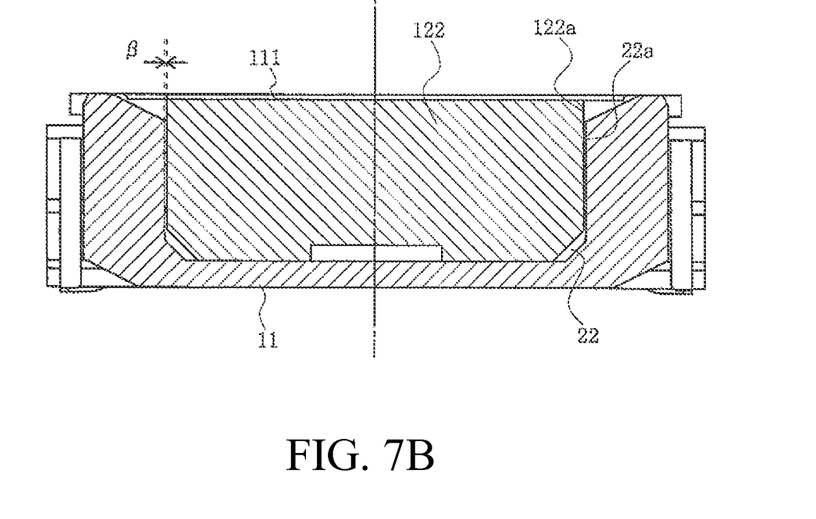
FIG. 7B is a cross-section view of the embodiment depicted in FIG. 6C, taken along Lines A-A in FIG. 6C.

As mentioned above, clearance is provided in the transverse direction of the first housing 11 between the inner wall surface 22a of the protruding end recessed portion 22 of the first housing 11 and the outer wall surface 122a of the second protruding end portion 122 of the second connector 101. Here, a gap is present in the transverse direction of the first housing 11, as shown in FIG. 7B, between the inner wall surface 22a of the protruding end recessed portion 22 of the first housing 11 and the outer wall surface 122a of the second protruding end portion 122 of the second connector 101 inserted into the protruding end recessed portion 22 when the first connector 1 and the second connector 101 have been mated so that the central axis in the transverse direction of the first housing 11 is aligned with the central axis in the transverse direction of the second housing 111. The size of this gap is the amount of clearance. In other words, the clearance in the transverse direction of the first housing 11 is the gap created between the opposing inner wall surface 22a and outer wall surface 122a when the horizontal cross-sectional profile of the first connector 1 is superimposed on the horizontal cross-sectional profile of the second connector 101 so that the central axis in the transverse direction of the first housing 11 is aligned with the central axis in the transverse direction of the second housing 111, and the size of the gap is the amount of clearance.

In the present embodiment, the amount of overlap with the first contact portion 65 or the second contact portion 66 is greater than the amount of clearance in the transverse direction of the first housing 11. More specifically, the amount of clearance in the transverse direction of the first housing 11 is β in FIG. 7B, and the relationship α1>α2>β is established.

Because the amount of overlap with the first contact portion 65 or the second contact portion 66 is greater than the amount of clearance in the transverse direction of the first housing 11, the amount of displacement does not exceed the amount of clearance, even when the second terminal 161 is displaced to the left or right in the transverse direction of the first housing 11 relative to the first terminal 61. As a result, the first contact portion 65 and the second contact portion 66 can be displaced, and the second terminal 161 remains clamped on both sides. This keeps the second terminal 161 from becoming detached from the first terminal 61 even when the second terminal 161 is displaced relative to the first terminal 61 in the transverse direction of the first housing 11, the first connector 1 and the second connector 101 remain reliably mated, the amount of displacement is suppressed, and a power flicker does not occur. Also, the electrified length from the tail portion 62 to the section making contact with the second terminal 161 does not change.

In the present embodiment, the first connector 1 includes a first housing 11, a plurality of first terminals 61 arranged and mounted side by side in the longitudinal direction of the first housing 11 on both sides in the transverse direction of the first housing 11, and 1a second connector 101 includes a second housing 111 mated with the first housing 1, a plurality of second terminals 161 arranged and mounted side by side in the longitudinal direction of the second housing 111 on both sides in the transverse direction of the second housing 111. Each of the first terminals 61 includes an opposing first contact portion 65 and second contact portion 66, each first contact portion 65 and second contact portion 66 overlap with a second terminal 161, and each second terminal 161 is inserted between the first contact portion 65 and second contact portion 66 of the corresponding first terminal 61 and establishes contact with the first terminal 61 when the first housing 11 and the second housing 111 are mated.

In this way, the first terminals 61 and the second terminals 161 remain reliably engaged, and the first connector 1 and the second connector 101 remain reliably mated. The second terminals 161 are prevented from detaching from the first terminals 61 even when the second terminals 161 are displaced in the transverse direction of the first housing 11 relative to the first terminals 61, the first connector 1 and the second connector 101 remain reliably mated, the amount of displacement is reduced, and a power flicker does not occur.

In addition, the amount of displacement between the first contact portion 65 and the second contact portion 66 is greater than the amount of clearance in the transverse direction of the first housing 11. This keeps both the first contact portion 65 and the second contact portion 66 from detaching from the second terminal 161 even when the second terminal 161 is displaced in the transverse direction of the first housing 11 relative to the first terminal 61, and the electrified length from the tail portion 62 to the portion in contact with the second terminal 161 does not change.

Among the first terminals 61, the first terminals 61A positioned on both ends of the first housing 11 in the longitudinal direction are wider than the other first terminals 61B. Among the second terminals 161, the second terminals 161A positioned on both ends of the second housing 111 in the longitudinal direction are wider than the other second terminals 161B. As a result, heat can be dissipated and does not build up in the first connector 1 and the second connector 101. This reduces the amount of displacement and prevents power flickers even when the second housing 111 is rotated or twisted relative to the first housing 11.

The vertical cross-sectional profile of all of the first terminals 61 is the same, and the vertical cross-sectional profile of all of the second terminals 161 is the same. In this way, all of the first terminals 61 and second terminals 161 remain equally engaged, and the first connector 1 and the second connector 101 remain reliably mated.

In the present embodiment, the second contact recessed portion 166a to the outside of each second terminal 161 makes contact with the second contact portion 66 of a first terminal 61 closer to the tail portion 62 and the held portion 63, and the flat first contact portion 165 inside the second terminal makes contact with the first contact portion 65 at the end farther from the tail portion 62 of the first terminal 61. Because the second contact portion 66 of the first terminal 61 is closer to the tail portion 62 and the held portion 63, it is more rigid and can come into contact with the second contact recessed portion 166a during mating with sufficient contact pressure and mating force.

Because the first contact portion 65 of the first terminal 61 is farther from the tail portion 62 and the held portion 63, it is relatively flexible and can make good contact with the flat first contact portion 165 of the second terminal 161. Contact is maintained along the entire width of the second contact recessed portion 166a and the second contact portion 66 even during an impact, and they remain in stable contact with the first contact portion 65 in the transverse direction of the terminal.

While a preferred embodiment of the Present Disclosure is shown and described, it is envisioned that those skilled in the art may devise various modifications without departing from the spirit and scope of the foregoing Description and the appended Claims.

What is claimed is:

1. A connector, the connector comprising:
a first connector, the first connector including a first connector main body and a plurality of first terminals, the first terminals being mounted side by side in the longitudinal direction of the first connector main body on both sides in the transverse direction of the first connector main body, each first terminal including a first contact portion and a second contact portion, the contact portions facing each other; and
a second connector, the second connector including a second connector main body, for mating with the first connector main body, and a plurality of second terminals, the second terminals being mounted side by side in the longitudinal direction of the second connector main body on both sides in the transverse direction of the second connector main body, the first contact portion and the second contact portion each overlap with the corresponding second terminal, the amount of overlap being greater than the amount of clearance in the transverse direction of the first connector main body, each second terminals being inserted between the first contact portion and the second contact portion of the corresponding first terminal and contacting the first terminal when the first connector main body is mated with the second connector main body.

2. The connector of claim 1, wherein the longitudinal cross-sectional profile of the first terminals is the same.

3. The connector of claim 2, wherein the longitudinal cross-sectional profile of the second terminals is the same.

4. The connector of claim 3, wherein each first terminal further includes a held portion, a first contact portion, a second contact portion and an elastically deformable contact arm portion connected to one end of the held portion, the held portion being held by the first connector main body, the second contact portion being positioned closer to the held portion than the first contact portion.

5. The connector of claim 4, wherein each first terminals further includes a tail portion, the tail portion being connected at one end to the held portion and connected electrically to a connecting pad on a board, the held portion being positioned farther to the outside in the transverse direction of the first connector main body than the contact arm portion.

6. The connector of claim 1, wherein each first terminal further includes a held portion, a first contact portion, a second contact portion and an elastically deformable contact arm portion connected to one end of the held portion, the held portion being held by the first connector main body, the second contact portion being positioned closer to the held portion than the first contact portion.

7. The connector of claim 6, wherein each first terminals further includes a tail portion, the tail portion being connected at one end to the held portion and connected electrically to a connecting pad on a board, the held portion being positioned farther to the outside in the transverse direction of the first connector main body than the contact arm portion.

8. The connector of claim 1, wherein, among the first terminals, the first terminals positioned on both ends of the first connector main body in the longitudinal direction are wider than the other first terminals.

9. The connector of claim 8, wherein, among the second terminals, the second terminals positioned on both ends of the second connector main body in the longitudinal direction are wider than the other second terminals.

10. The connector of claim 9, wherein the longitudinal cross-sectional profile of the first terminals is the same.

11. The connector of claim 10, wherein the longitudinal cross-sectional profile of the second terminals is the same.

12. The connector of claim 11, wherein each first terminal further includes a held portion, a first contact portion, a second contact portion and an elastically deformable contact arm portion connected to one end of the held portion, the held portion being held by the first connector main body, the second contact portion being positioned closer to the held portion than the first contact portion.

13. The connector of claim 12, wherein each first terminals further includes a tail portion, the tail portion being connected at one end to the held portion and connected electrically to a connecting pad on a board, the held portion being positioned farther to the outside in the transverse direction of the first connector main body than the contact arm portion.

14. The connector of claim 9, wherein each first terminal further includes a held portion, a first contact portion, a second contact portion and an elastically deformable contact arm portion connected to one end of the held portion, the held portion being held by the first connector main body, the second contact portion being positioned closer to the held portion than the first contact portion.

15. The connector of claim 14, wherein each first terminals further includes a tail portion, the tail portion being connected at one end to the held portion and connected electrically to a connecting pad on a board, the held portion being positioned farther to the outside in the transverse direction of the first connector main body than the contact arm portion.

* * * * *